US011463681B2

(12) United States Patent
Aflaki Beni et al.

(10) Patent No.: US 11,463,681 B2
(45) Date of Patent: Oct. 4, 2022

(54) ENCODING AND DECODING OF VOLUMETRIC VIDEO

(71) Applicant: Nokia Technologies Oy, Espoo (FI)

(72) Inventors: Payman Aflaki Beni, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 16/971,143

(22) PCT Filed: Feb. 14, 2019

(86) PCT No.: PCT/FI2019/050116
§ 371 (c)(1),
(2) Date: Aug. 19, 2020

(87) PCT Pub. No.: WO2019/162567
PCT Pub. Date: Aug. 29, 2019

(65) Prior Publication Data
US 2021/0112240 A1    Apr. 15, 2021

(30) Foreign Application Priority Data
Feb. 23, 2018  (FI) .................................... 20185174

(51) Int. Cl.
*H04N 13/395*  (2018.01)
*H04N 13/344*  (2018.01)
*H04N 13/161*  (2018.01)

(52) U.S. Cl.
CPC ......... *H04N 13/395* (2018.05); *H04N 13/161* (2018.05); *H04N 13/344* (2018.05)

(58) Field of Classification Search
CPC ... H04N 13/395; H04N 13/344; H04N 13/161
See application file for complete search history.

(56) References Cited

U.S. PATENT DOCUMENTS 8,218,895 B1    7/2012  Gleicher et al.
9,633,473 B2    4/2017  Tian et al.
(Continued)

FOREIGN PATENT DOCUMENTS

EP          3777185 A1    2/2021
WO    2006/096162 A2    9/2006
(Continued)

OTHER PUBLICATIONS

Viola et al., "Importance-driven Feature Enhancement in Volume Visualization", IEEE Transactions on Visualization and Computer Graphics, vol. 11, No. 4, Jul.-Aug. 2005, pp. 1-13.
(Continued)

*Primary Examiner* — Sing-Wai Wu
*Assistant Examiner* — Khoa Vu
(74) *Attorney, Agent, or Firm* — Joseph C. Drish; Harrington & Smith

(57) ABSTRACT

There are disclosed various apparatuses, methods, and computer program products for coding volumetric video, where information of a three-dimensional scene is obtained and at least one projection plane for the scene is determined (602). At least a first projection direction is determined for a first part of the projection plane and a second projection direction is determined for a second part of the projection plane so that the first projection direction is different from the second projection direction (604). A first part of the scene is projected on the projection plane from the first projection direction (610); and a second part of the scene is projected on the projection plane from the second projection direction (610). The projection plane is encoded (612). Information of at least one projection plane of a three-dimensional scene, information of at least a first projection direction for a first part of the projection plane and a second projection direction for a second part of the projection plane are decoded. The
(Continued)

first projection direction is different from the second projection direction. The decoded information is used to obtain reconstructed geometry data of different parts of the projection plane, and the reconstructed geometry data is used to form a reconstructed 3D image.

25 Claims, 11 Drawing Sheets

(56) References Cited

U.S. PATENT DOCUMENTS

| | | | |
|---|---|---|---|
| 2004/0125103 A1* | 7/2004 | Kaufman | G06T 15/08 345/419 |
| 2004/0222987 A1 | 11/2004 | Chang et al. | |
| 2004/0247173 A1 | 12/2004 | Nielsen et al. | |
| 2008/0252641 A1 | 10/2008 | Masumoto et al. | |
| 2011/0074785 A1* | 3/2011 | Moriya | G06T 19/00 345/427 |
| 2011/0092812 A1 | 4/2011 | Webber et al. | |
| 2017/0336705 A1 | 11/2017 | Zhou et al. | |
| 2018/0199029 A1 | 7/2018 | Van Der Auwera et al. | |
| 2018/0241986 A1* | 8/2018 | Zhong | G06F 3/04815 |
| 2019/0304160 A1* | 10/2019 | Izumi | H04N 13/117 |
| 2020/0380765 A1* | 12/2020 | Thudor | G06T 17/10 |
| 2021/0174559 A1* | 6/2021 | Nakagami | G06T 7/50 |

FOREIGN PATENT DOCUMENTS

| | | |
|---|---|---|
| WO | 2016/071566 A1 | 5/2016 |
| WO | 2017/202700 A1 | 11/2017 |
| WO | 2019/034808 A1 | 2/2019 |
| WO | 2019/197708 A1 | 10/2019 |

OTHER PUBLICATIONS

Mammou, "PCC Test Model Category 2 v0", ISO/IEC JTC1/SC29/WG11 N17248, 3DG, Oct. 2017, 11 pages.

Hu et al., "A Survey on Visual Surveillance of Object Motion and Behaviors", IEEE Transactions on Systems, Man, and Cybernetics, Part C Applications and Reviews, vol. 34, No. 3, Aug. 2004, pp. 334-352.

Cedras et al., "Motion-based Recognition a Survey", Image and Vision Computing, vol. 13, No. 2, Mar. 1995, pp. 129-155.

Joshi et al., "A Survey on Moving Object Detection and Tracking in Video Surveillance System", International Journal of Soft Computing and Engineering (IJSCE), vol. 2, No. 3, Jul. 2012, pp. 44-48.

"Information technology—Dynamic adaptive streaming over HTTP (DASH)—Part 1: Media presentation description and segment formats", ISO/IEC 23009-1, Second Edition, May 15, 2014, 152 pages.

Office action received for corresponding Finnish Patent Application No. 20185174, dated Nov. 14, 2018, 10 pages.

Schwarz et al., "Nokia's response to CfP for Point Cloud Compression (Category 2)", ISO/IEC JTC1/SC29/WG11 MPEG2017/M41779, Nokia Technologies, Oct. 2017, 22 pages.

He et al., "Best-Effort Projection Based Attribute Compression for 3D Point Cloud", 23rd Asia-Pacific Conference on Communications (APCC), Dec. 11-13, 2017, 6 pages.

International Search Report and Written Opinion received for corresponding Patent Cooperation Treaty Application No. PCT/FI2019/050116, dated Jun. 4, 2019, 19 pages.

Extended European Search Report received for corresponding European Patent Application No. 19758103.6, dated Oct. 18, 2021, 12 pages.

Obm et al., "Incomplete 3-D Multiview Representation of Video Objects", IEEE Transactions on Circuits and Systems for Video Technology, vol. 9, No. 2, Mar. 1999, pp. 389-400.

Zare et al., "HEVC-compliant viewport-adaptive streaming of stereoscopic panoramic video", Picture Coding Symposium (PCS), Dec. 4-7, 2016, 5 pages.

Office action received for corresponding Indian Patent Application No. 202047039950, dated Aug. 30, 2021, 7 pages.

* cited by examiner

ENCODING AND DECODING OF VOLUMETRIC VIDEO

RELATED APPLICATION

This application claims priority to PCT Application No. PCT/FI2019/050116, filed on Feb. 14, 2019, which claims priority to Finland Patent Application No. 20185174, filed on Feb. 23, 2018, each of which is incorporated herein by reference in its entirety.

BACKGROUND

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. color, opacity, reflectance and any possible temporal changes of the geometry and attributes at given time instances, comparable to frames in two-dimensional (2D) video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

Because volumetric video describes a 3D scene (or object), such data may be viewed from any viewpoint. Therefore, volumetric video may be a useful format for any AR, VR, or MR applications, especially for providing six degrees of freedom (6DOF) viewing capabilities.

Conventional flat 2D plane projection is mostly used for projecting different parts of objects in front of the projection plane. However, it may be necessary to have more and more content to be projected to the same projection plane with higher quality. Meaning that, the size and amount of projected content to the projection planes is needed to be reduced.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and a decoder), a system and a computer readable medium comprising a computer program or a signal stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information, comprising e.g. projection or projection surface type, location and orientation of the projection surface in 3D space, and/or size of the projection surface, may be transmitted either in the same bitstream or separately along the bitstream. At the receiver side, the bitstream may be decoded and volumetric video may be reconstructed from decoded 2D projections and projection geometry information.

In accordance with an embodiment, projection of a wider amount of content to the same size projection plane may be achieved, while exploiting content characteristics to maintain the reconstruction quality. Adaptive projection direction (PD) in arbitrary directions is defined to project the content of objects to the projection plane. In other words, a higher/lower (typically used for higher) viewing zone on a similar size projection plane may be presented. This means that, from top to bottom (and left to right) of the 2D projection plane, it does not necessarily have only perpendicular projection direction, but also it can also have a projection direction with any arbitrary and different angular directions towards the projection plane. This may enable the projection plane to cover a wider viewing area in front of it, as opposed to a conventional perpendicular projection. Moreover, it may enable selection of areas with higher importance to receive more projection plane surface, i.e. higher detail projection, compared to areas which may require less details.

In short, an embodiment introduces a projection plane with freedom to follow a region of interest (ROI) in front of it and receive more information from there as compared to other locations. e.g. any arbitrary plane to project the content as if it was using a fish eye lens in front of it (to increase the viewing angle of the projection plane, as well as adaptively defining quality of the projected content to it).

According to a first aspect, there is provided an apparatus comprising at least one processor, memory including computer program code, the memory and the computer program code configured to, with the at least one processor, cause the apparatus to perform at least the following:

obtain information of a three-dimensional scene;
determine at least one projection plane for the scene;
determine at least a first projection direction for a first part of the projection plane and a second projection direction for a second part of the projection plane so that the first projection direction is different from the second projection direction;
project a first part of the scene on the projection plane from the first projection direction;
project a second part of the scene on the projection plane from the second projection direction; and
encode the projection plane.

According to a second aspect, there is provided an apparatus comprising at least one processor, memory including computer program code, the memory and the computer program code configured to, with the at least one processor, cause the apparatus to perform at least the following:

decode information of at least one projection plane of a three-dimensional scene;

decode information of at least a first projection direction for a first part of the projection plane and a second projection direction for a second part of the projection plane, wherein the first projection direction is different from the second projection direction;

use the decoded information to obtain reconstructed geometry data of different parts of the projection plane; and use the reconstructed geometry data to form a reconstructed 3D image.

According to a third aspect, there is provided a method comprising:

obtaining information of a three-dimensional scene;

determining at least one projection plane for the scene;

determining at least a first projection direction for a first part of the projection plane and a second projection direction for a second part of the projection plane so that the first projection direction is different from the second projection direction;

projecting a first part of the scene on the projection plane from the first projection direction;

projecting a second part of the scene on the projection plane from the second projection direction;

encoding the projection plane.

According to a fourth aspect, there is provided a method comprising:

decoding information of at least one projection plane of a three-dimensional scene;

decoding information of at least a first projection direction for a first part of the projection plane and a second projection direction for a second part of the projection plane, wherein the first projection direction is different from the second projection direction;

using the decoded information to obtain reconstructed geometry data of different parts of the projection plane; and using the reconstructed geometry data to form a reconstructed 3D image.

According to further aspects, there are provided computer program products embodied on a non-transitory computer readable medium, comprising computer program code configured to, when executed on at least one processor, cause an apparatus or a system to carry out the method of the third or fourth aspect.

Using the adaptive projection direction approach may have the advantage that more area in front of the projection plane may be covered as compared to the conventional perpendicular projection direction. Thus, fewer projection surface may be required leading to a gain in compression efficiency. Also request of interest (ROI) quality adjustment may be enabled based on the projection direction concentration on different areas of the scene leading to more flexibility in content representation.

DESCRIPTION OF THE DRAWINGS

In the following, various embodiments of the invention will be described in more detail with reference to the appended drawings, in which.

DESCRIPTION OF EXAMPLES

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

In the following description the following interpretations of certain terms are assumed unless expressed otherwise: the scene refers to a 3D scene or a volumetric scene, an object refers to a 3D object, and projection refers to projection of the objects from the 3D scene to a projection to a 2D plane. A patch may comprise a projection of at least a portion of at least one object in the scene to the projection plane.

For the rest of this application, the projection plane is considered as a 1D line and not a plane, however, similar discussions and proposals are easily applicable to the 2D plane. This is for the similarity and easier description of the idea.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

A volumetric video frame is a sparse voxel octree or a point cloud that models the world at a specific point in time, similar to a frame in a 2D video sequence. Voxel or point attributes contain information like colour, opacity, surface normal vectors, and surface material properties. These are referenced in the sparse voxel octrees (e.g. colour of a solid voxel) or point clouds, but can also be stored separately.

Figure 1:
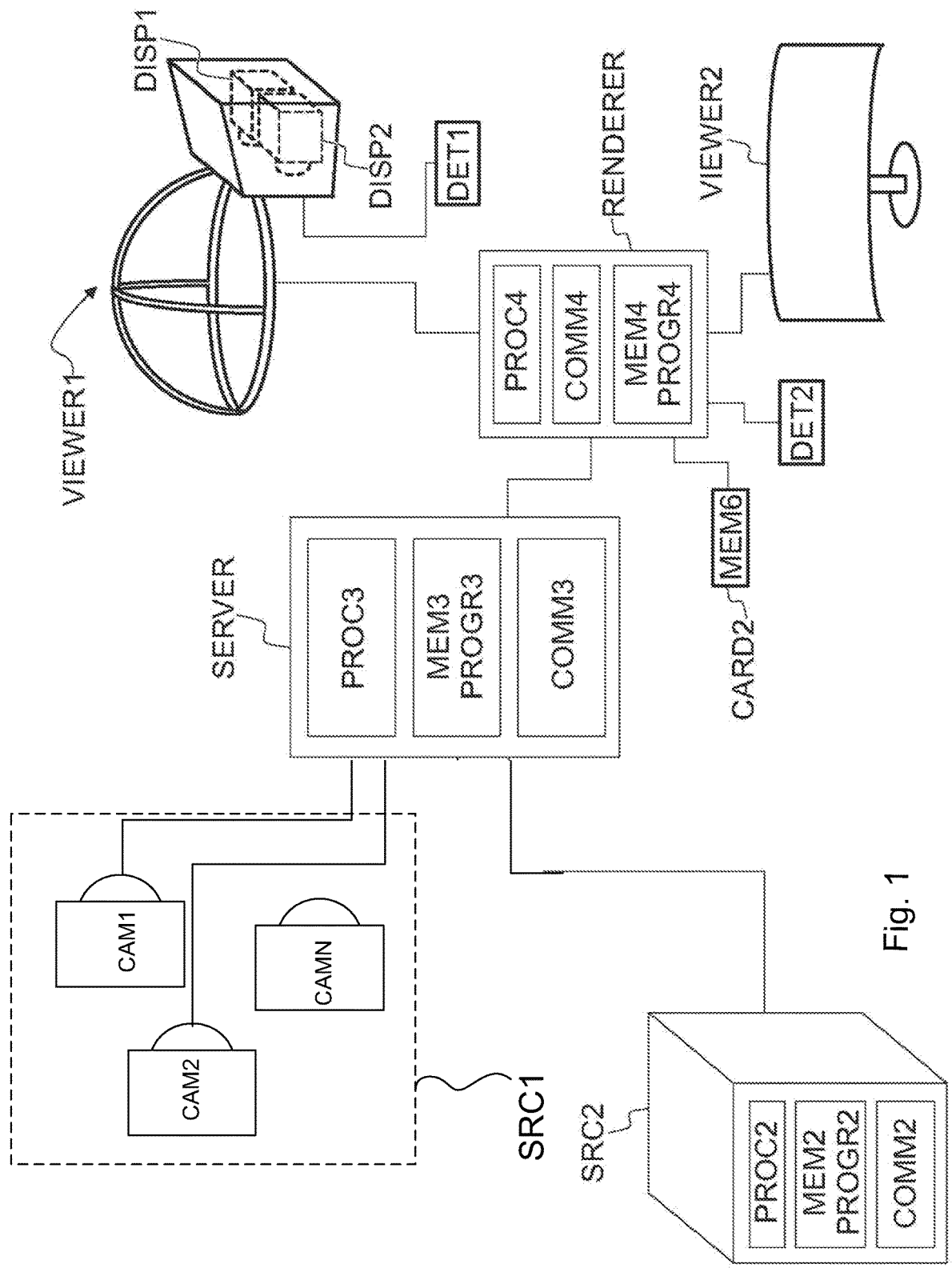
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to a computer processor (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device. Each of the processors PROC1 to PROC4 may include one or more processors comprising processor circuitry.

Any of the devices (SRC1, SRC2, SERVER, RENDERER, VIEWER1, VIEWER2) may be a computer or a portable computing device, or be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
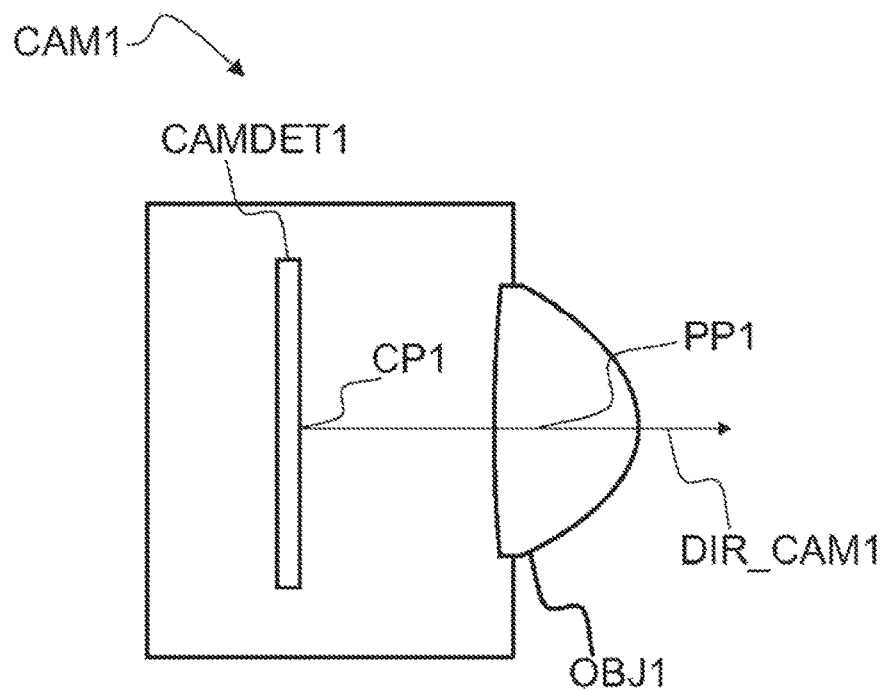
FIGS. 2a and 2b show a capture device and a viewing device.
Figure 2B:
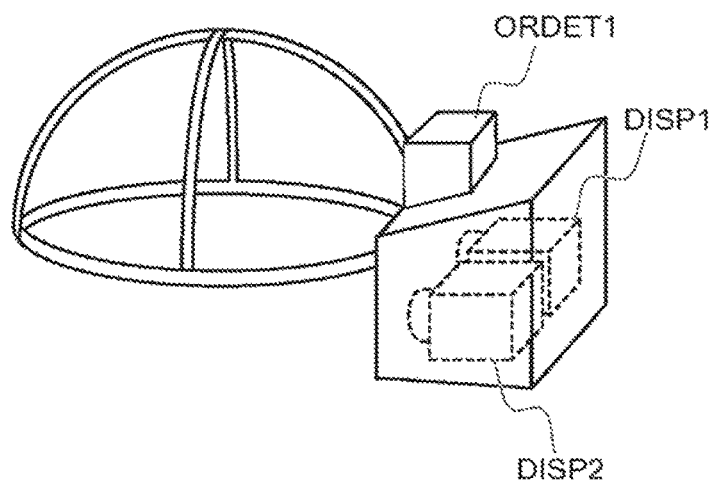

FIGS. 2a and 2b show a capture device and a viewing device. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
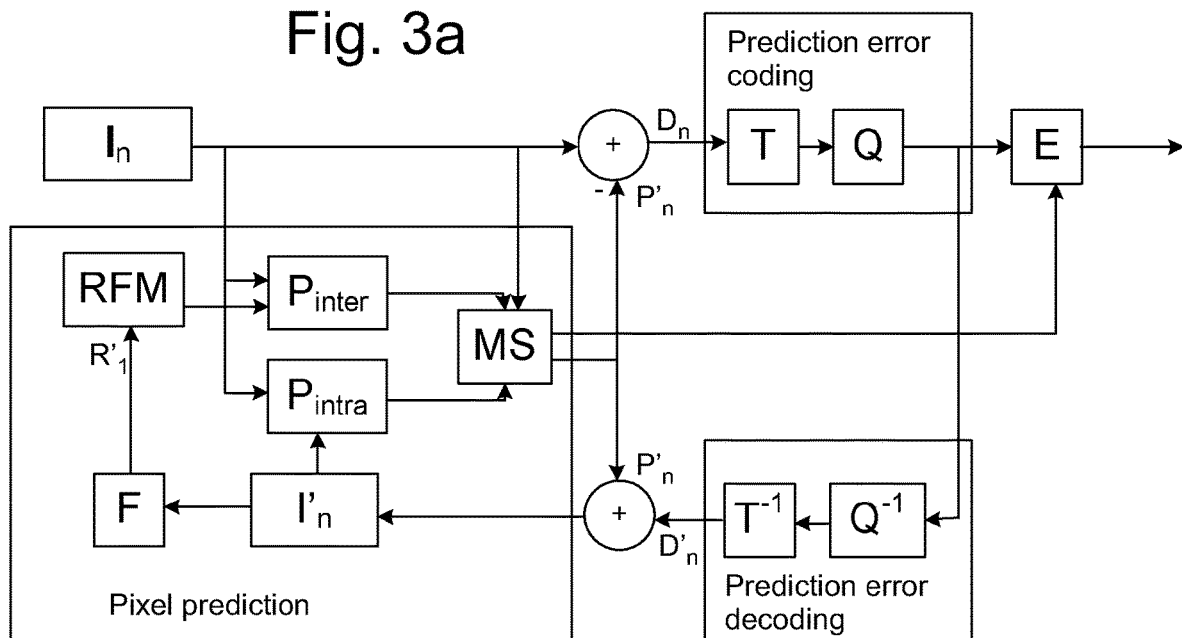
FIGS. 3a and 3b show an encoder and decoder for encoding and decoding texture pictures, geometry pictures and/or auxiliary pictures.
Figure 3B:
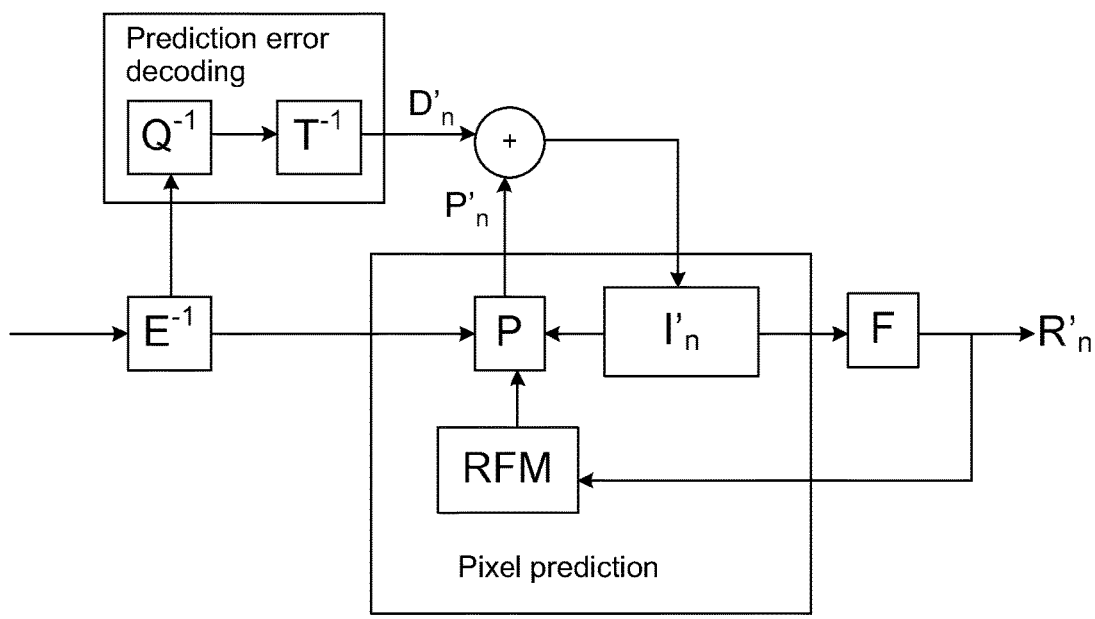

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I''); a predicted representation of an image block (P'''); a prediction error signal (D''); a reconstructed prediction error signal (D'''); a preliminary reconstructed image (I'''); a final reconstructed image (R'''); a transform (T) and inverse transform ($T^{-1}$); a quantization (Q) and inverse quantization ($Q^{-1}$); entropy encoding (E); a reference frame memory (RFM); inter prediction ($P^{inter}$); intra prediction ($P^{intra}$); mode selection (MS) and filtering (F).

An example of a decoding process is illustrated in FIG. 3b. FIG. 3b illustrates a predicted representation of an image block (P'''); a reconstructed prediction error signal (D'''); a preliminary reconstructed image (F); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

Because volumetric video describes a 3D scene or object at different (successive) time instances, such data can be viewed from any viewpoint. Therefore, volumetric video may be an important format for any augmented reality, virtual reality and mixed reality applications, especially for providing viewing capabilities having six degrees of freedom (so-called 6DOF viewing).

Figure 4:
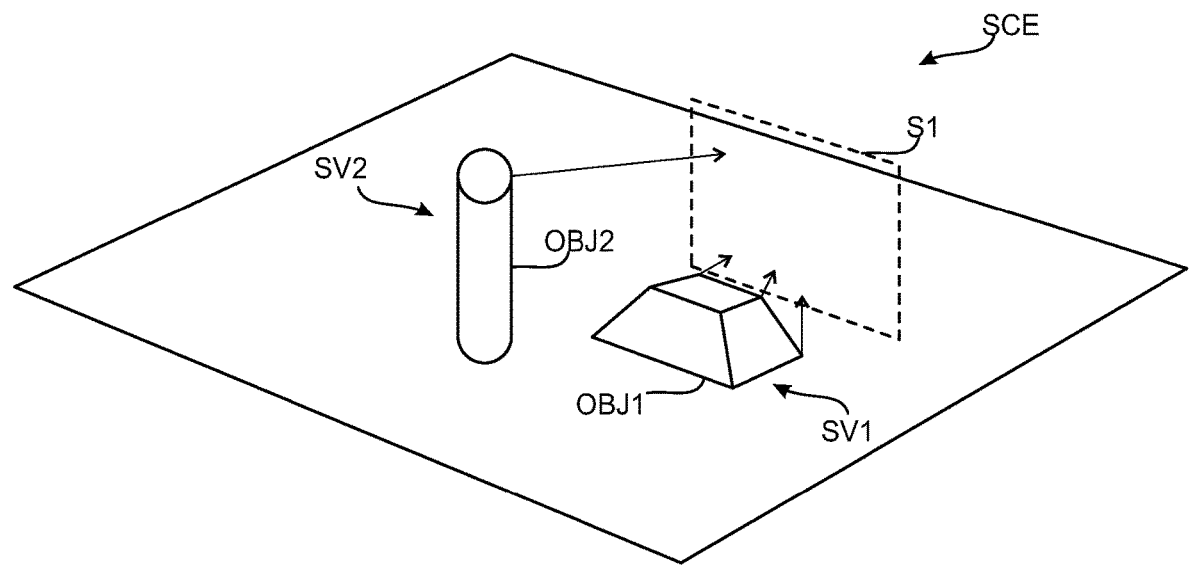
FIG. 4 illustrates projection of source volumes in a scene and parts of an object to projection surfaces, as well as determining depth information.

FIG. 4 illustrates projection of source volumes in a digital scene model SCE and parts of an object model OBJ1, OBJ2 to a projection surface S1 for the purpose of encoding volumetric video.

The projection of source volumes may result in texture pictures and geometry pictures, and there may be geometry information related to the projection source volumes and/or projection surfaces. Texture pictures, geometry pictures and projection geometry information may be encoded into a bitstream. A texture picture may comprise information on the color data of the source of the projection. Through the projection, such color data may result in pixel color information in the texture picture. Pixels may be coded in groups, e.g. coding units of rectangular shape. The projection geometry information may comprise but is not limited to one or more of the following:

projection type, such as planar projection or equirectangular projection projection surface type, such as a cube
location of the projection surface in 3D space
orientation of the projection surface in 3D space
size of the projection surface in 3D space
type of a projection center, such as a projection center point, axis, or plane
location and/or orientation of a projection center.

The projection type may also indicate whether the projection direction is adaptive within the projection plane or whether perpendicular projection is used. Alternatively, a separate parameter of flag may be provided to indicate adaptive or perpendicular projection. The projection may take place by projecting the geometry primitives (points of a point could, triangles of a triangle mesh or voxels of a voxel array) of a source volume SV1, SV2 (or an object OBJ1, OBJ2) onto a projection surface S1. The geometry primitives may comprise information on the texture, for example a colour value or values of a point, a triangle or a voxel. The projection surface may surround the source volume at least partially such that projection of the geometry primitives happens from the center of the projection surface outwards to the surface. For example, a cylindrical surface has a center axis and a spherical surface has a center point. A cubical or rectangular surface may have center planes or a center axis and the projection of the geometry primitives may take place either orthogonally to the sides of the surface or from the center axis outwards to the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively or in addition, the projection surface such as a planar surface or a sphere may be inside a group of geometry primitives, e.g. inside a point cloud that defines a surface. In the case of an inside projection surface, the projection may take place from outside in towards the center and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the center of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

In the following, only a planar projection plane is assumed, but embodiments of the invention may be applied to other types of projection surfaces as well.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

As illustrated in FIG. 4, a first texture picture may be encoded into a bitstream, and the first texture picture may comprise a first projection of texture data of a first source volume SV1 of a scene model SCE onto a first projection surface S1. The scene model SCE may comprise a number of further source volumes SV2.

Figures 5A, 5B:
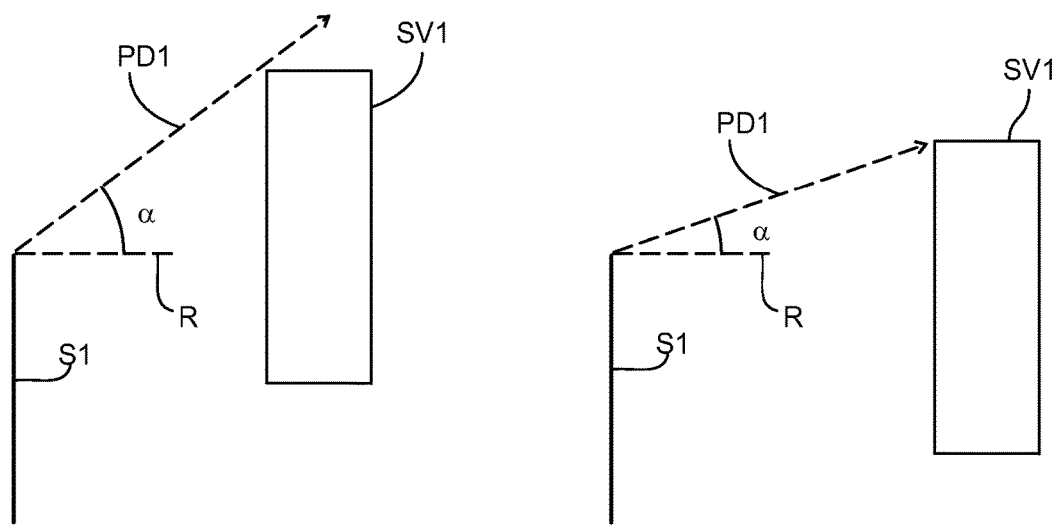
FIGS. 5a and 5b illustrate examples of definitions of projection planes different from perpendicular projection planes, in accordance with an embodiment.
Figure 6A:
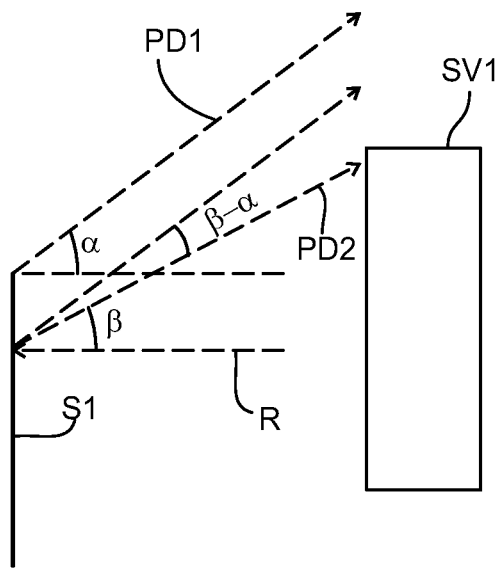
FIG. 6a illustrates an example in which a next projection direction is defined based on a previous projection direction, in accordance with an embodiment.
Figure 6B:
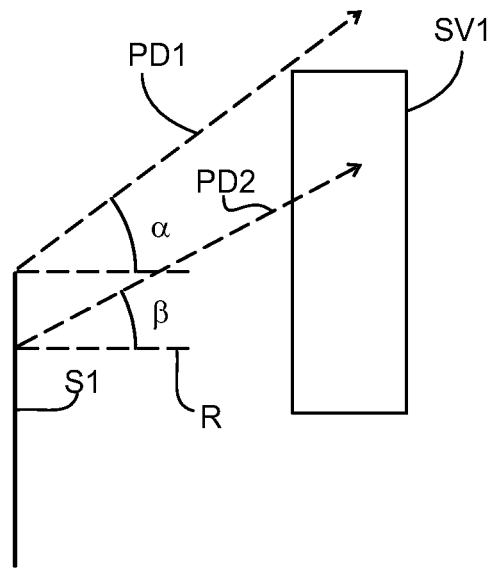
FIG. 6b illustrates an example in which a next projection direction is defined against the same reference direction than the previous projection direction, in accordance with an embodiment.
Figure 7A:
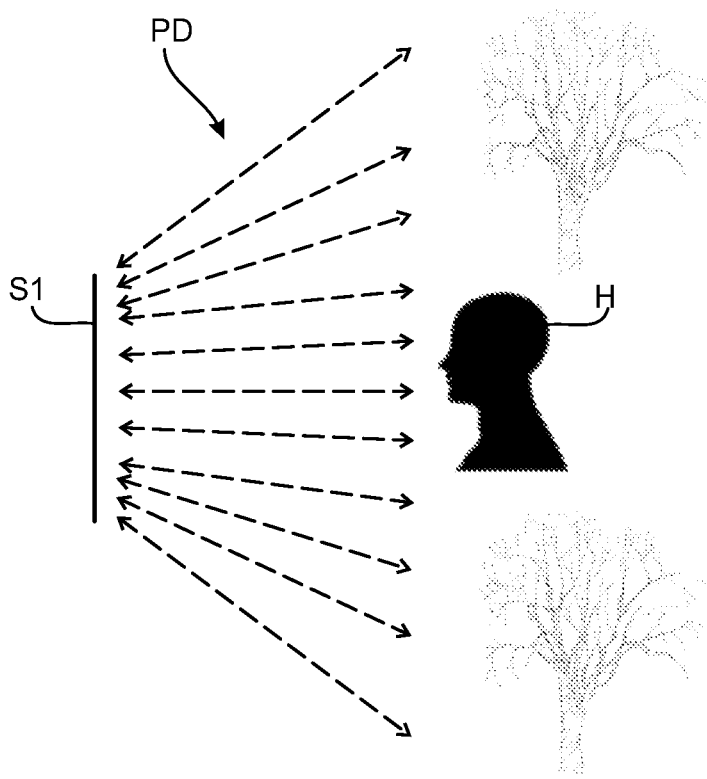
FIGS. 7a to 7c show some examples of combinations of projection planes, in accordance with an embodiment.
Figure 7B:
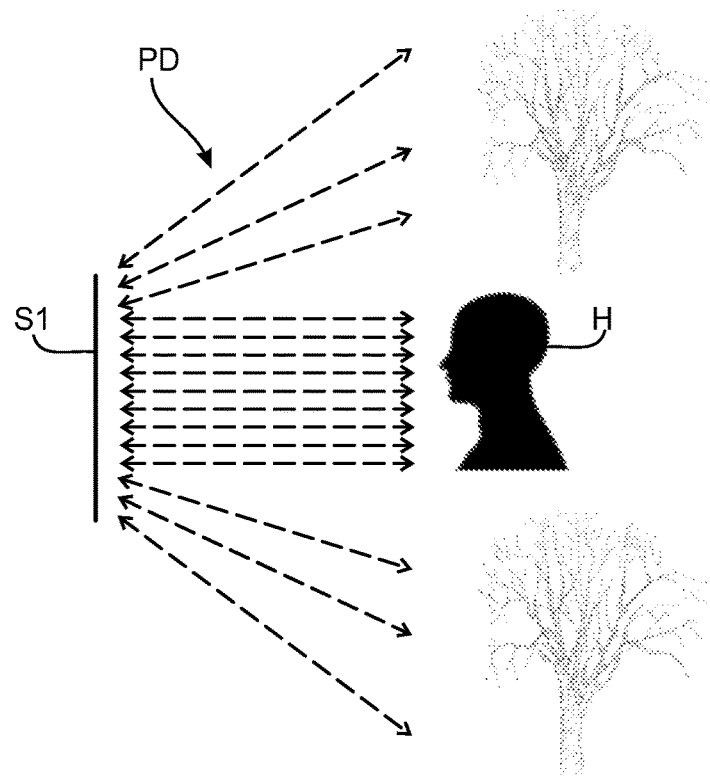
Figure 7C:
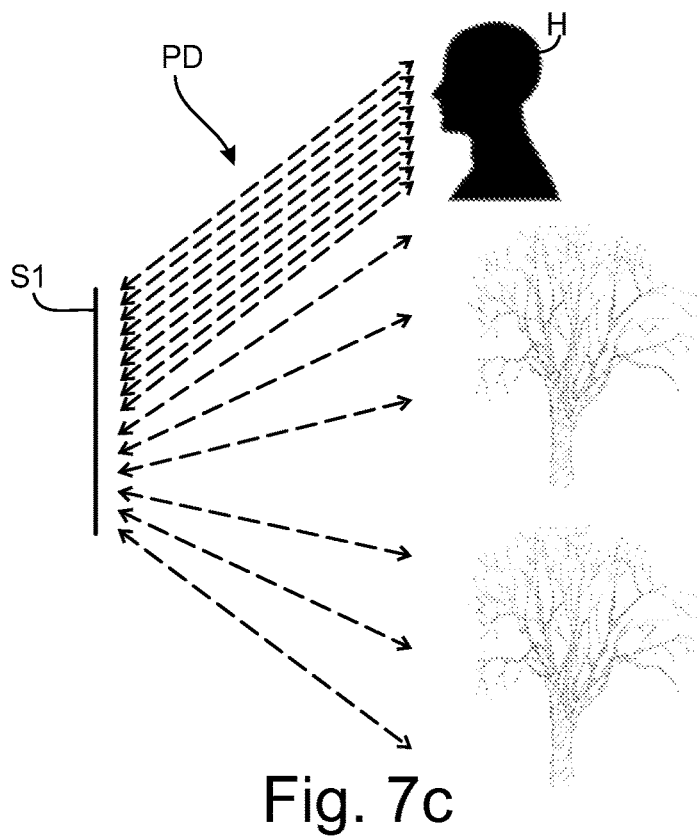
Figures 8A, 8B, 8C:
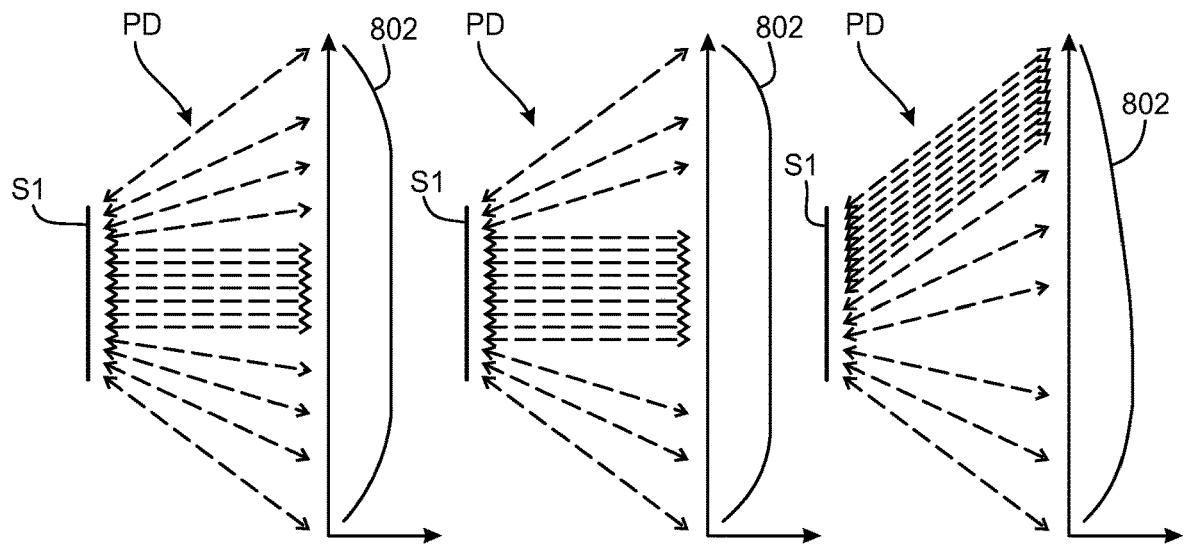
FIGS. 8a to 8c show some examples of curves illustrating projection directions as a function of location of a point to be projected, in accordance with an embodiment.
Figure 9A:
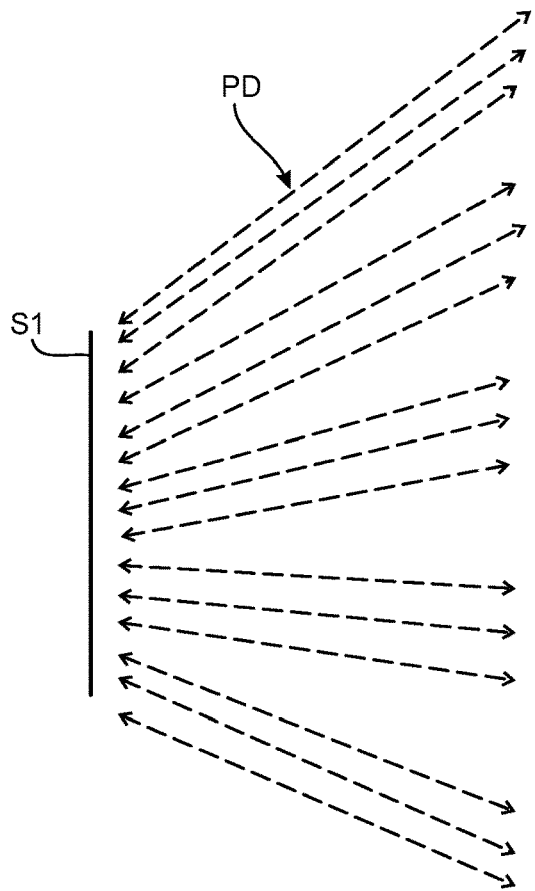
FIGS. 9a and 9b illustrate examples of adaptive projection planes, in accordance with an embodiment.
Figure 9B:
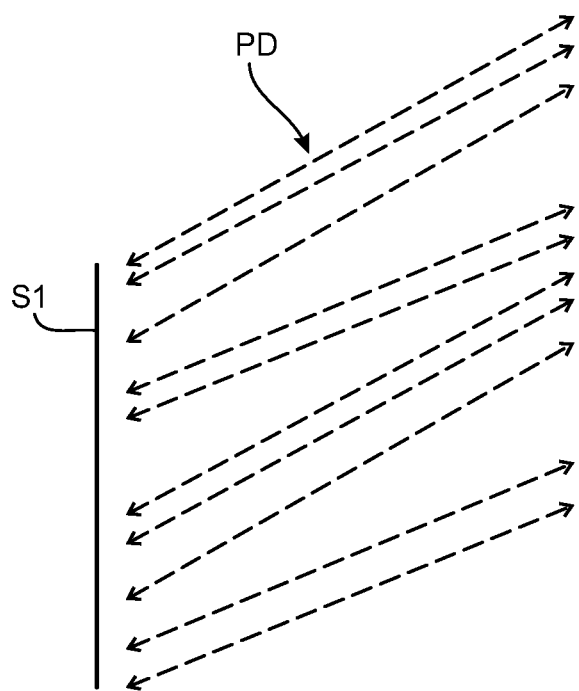
Figure 10A:
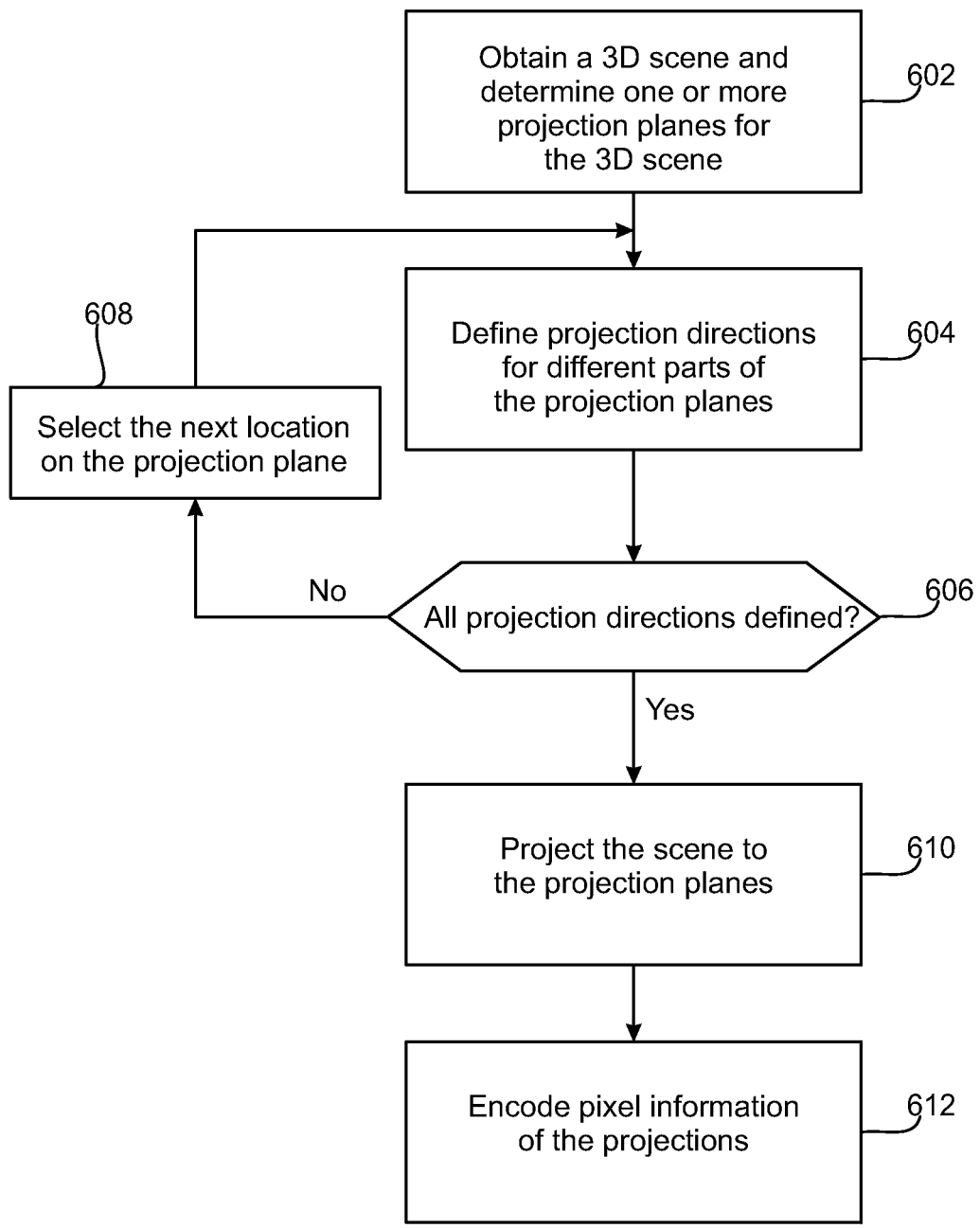
FIGS. 10a and 10b show flow charts for encoding and decoding of a three-dimensional scene, in accordance with an embodiment.
Figure 11A:
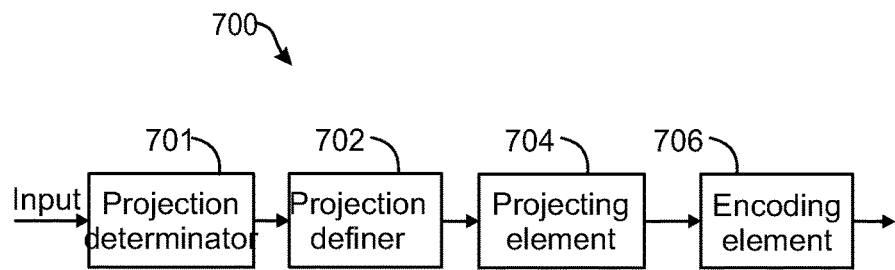
FIGS. 11a and 11b show block diagrams of an encoder and a decoder, in accordance with an embodiment.

In the following an example method is described with reference to the block diagram of an encoder 700 in FIG. 11a, a flow diagram depicted in FIG. 10a, and some examples of projections in FIGS. 5a to 9b. FIGS. 5a and 5b illustrate examples of definitions of projection planes different from perpendicular projection planes, in accordance with an embodiment; FIGS. 7a to 7c show some examples of combinations of projection planes, in accordance with an embodiment; FIGS. 8a to 8c show some examples of curves illustrating projection directions as a function of location of a point to be projected, in accordance with an embodiment; and FIGS. 9a and 9b illustrate examples of adaptive projection planes, in accordance with an embodiment.

In step 602, a three-dimensional content is obtained and one or more projection planes S1 are determined for source volumes SV1, SV2 by a projection determinator 701.

In step 604, a first projection direction PD1 of a first location in the projection plane S1 is defined by a projection definer 702. In this embodiment the first location is the topmost point on the projection plane S1. The first projection direction PD1 may be defined with an angle α as illustrated in FIGS. 5a and 5b. In the example of FIG. 5a the first projection angle α is 40 degrees and in the example of FIG. 5b the first projection angle α is 25 degrees. It should be noted that these projection angles are just examples and also other angles may be used. Furthermore, as will be explained later in this specification, more than one projection angle may be used at different parts of the projection plane S1.

As is depicted in FIGS. 5a and 5b, the projection direction angle α is defined with respect to a reference direction R, which is the surface normal of the projection plane S1 towards the source volume SV1 in this example, but also a different definition for the reference direction may be used.

The first location for which the projection direction angle is determined need not be the top location but may also be another location on the projection plane S1.

When moving to the next projection directions on the projection plane, similar angle is considered to define the projection direction. Therefore, the next projection direction, β, may be defined based on the angle α. An example of this is illustrated in FIG. 6a. A projection direction may be therefore defined by using another projection direction as reference direction. Alternatively, the next projection direction may be defined similarly as a and against the reference direction R, for example the surface normal. An example of this is illustrated in FIG. 6b. The same projection direction may be used for a plurality of locations of the projection plane.

In step 606 it is examined whether the projection direction has been defined for all locations of the projection plane S1. If the examination reveals that there are still one or more locations for which the projection direction has not been defined, the process continues by selecting a next location at step 608 and repeating the steps 604 and 606 for the selected location. In step 604 the projection direction does not need to be the same as the first projection direction and may differ from that. If the projection direction (e.g. β in the examples of FIGS. 6a and 6b) is different from the first direction (e.g. α in the examples of FIGS. 6a and 6b) i.e. the new angle β is different from the first angle α, the new angle β may be indicated, for example, as a difference between the first angle α and the new angle β (i.e. β—α or α-β), or the new angle β may be indicated as an absolute angle with reference to the reference direction (e.g. R in the examples of FIGS. 6a and 6b).

The above process (steps 604-608) may be performed, until the whole surface of the projection plane is covered with appropriate and adaptively defined projection directions. The projection direction definition may be performed for the whole projection plane S1, for example, from top to bottom and from left to right if the projection directions may differ in both vertical and horizontal direction. However, in accordance with an embodiment, the projection direction may be the same for each location in the projection plane horizontally and may only change in the vertical direction, or vice versa. Therefore, it is sufficient to define the projection direction for one location horizontally/vertically and use the same projection direction for each location in the same horizontal/vertical part of the projection plane S1.

When the projection direction has been defined for different parts of the projection plane S1, point clouds and/or arrays of voxels or mesh models representing objects/source volumes of the scene SCE are projected 610 onto the projection plane(s) S1 by a projecting element 704 resulting in a two-dimensional pixel image. Standard 2D video coding may be applied for each projection to code 612 the pixel information resulting from the texture data by an encoding element 706. In connection with the texture information, relevant projection geometry information, comprising e.g. projection or projection surface type, location and orientation of the projection surface in 3D space, and/or size of the projection surface, may be transmitted either in the same bitstream or separately along the bitstream.

Some examples of different combinations of projection planes and projection directions are depicted in FIGS. 7a to 7c. In FIG. 7a the projection directions adaptively change from the top part towards the center part. At the top part the projection angle is quite large and decreases when moving downwards on the projection plane S1. About at the height of the head H in FIG. 7a the projection direction is about 0 degrees i.e. parallel to the surface normal. The projection direction remains the same when moving further downwards until the bottom part of the head H has been reached. From that point the projection direction begins to diverge from the surface normal. This kind of arrangement means that higher details of the projected source volume are maintained at those areas where the projection direction remains the same or almost the same. In the example of FIG. 7a this happens in the middle where the projection direction is the same than the surface normal. In other words, a higher quality is in the middle and lower quality is in lower/higher part of projected content on the projection plane.

The higher quality can be recognized from concentration of the projection directions. The higher the concentration of projection directions, the higher the quality of the projected content and the higher the amount of details projected. In FIG. 7b, similar content projection as in FIG. 7a is depicted with the difference that the details of human face are more covered compared to FIG. 7a while sacrificing the quality of projected trees to the projection plane. Again, this can be recognized from the higher number of projection directions in the middle of FIG. 7b compared to that of FIG. 7a. Moreover, less projection directions on trees shows lower quality on the projected images in those areas and for those objects of the scene. Moreover, the angle of the top projection direction and the bottom projection direction shows how wide area in front of the projection plane is projected to the plane. The higher the difference of the top and bottom projection directions, the wider the area which is projected to the projection plane. The wider may refer to higher viewing angle from the location of the projection plane.

In FIG. 7c, the higher concentration of the projection directions follows the movement of the human face and goes towards the top front of the projection plane. Such example shows an embodiment where the higher concentration of the projection directions follows the object or a region of interest (ROI).

In another embodiment, there may be more than one region of interest with higher concentration of projection directions.

In another embodiment, the concentration density of projection directions on the projection plane may differ for any arbitrary shape on the projection plane according to the quality requirements of the projection. In other words, for an oval shape on the projection plane the concentration of the projection directions may be high in the case that the oval shape refers to the face of a user while the rest of the image has lower concentration of projection directions. Similarly, an arbitrary shape, fitting projection of a car, in a car exhibition may be used to represent a higher concentration of projection directions to project that car.

In another embodiment, the projection directions on top and bottom of the projection plane (similarly on left and right side on a 2D projection plane) may not be symmetrical. It means that the angles of top projection direction and the bottom projection direction do not necessarily have to be identical.

In another embodiment, symmetric projection direction angles may be used on opposite edge regions of the projection plane, for example the top portion or bottom portion of the projection plane. In one example the top and bottom portions comprise top half and bottom half of the projection plane. This embodiment may be used for imitating the presence of a lens in front of the projection plane, e.g. having a fish eye lens in front of the projection plane. This is similar to the examples presented in FIGS. 7a and 7b. In this embodiment, the concentration and direction of projection directions may represent the strength and shape of the said lens used in front of the projection plane.

In one embodiment, the distance between the projection directions is decided based on the resolution capabilities of the projection plane and the details level required. This means the density or sparseness (close or far from each other) or the projection directions depends on the spatial resolution of the projection plane. The higher the spatial resolution of the projection plane, the closer the projection directions are to each other and the lower the resolution of the projection plane, the farther the projection directions are from each other. Moreover, such spatial resolution of the projection plane defines whether or not it is required to use all available pixels in the projection plane or not. If, less details are required with a projection plane which has a high spatial resolution, then, a sub-sampling will be used when projection the content to the projection plane. Alternatively, if high quality in all directions is required, all available pixels in the projection plane are utilized. The spatial resolution of the projection plane may differ vertically and horizontally. The definition of projection directions and their location will follow the spatial resolution of the projection plane, when needed.

In another embodiment, the projection plane may be divided to blocks and each block shares the same projection direction (for 2D projection plane). If the number of projection directions per block is fixed, then the size of these blocks defines how many projection directions are to be transmitted for the whole projection plane. The larger the block size, the smaller the number of projection directions to be transmitted, and the smaller the block size (the higher the number of blocks), the higher the number of projection directions to be transmitted. The blocks may have different sizes and yet include similar distribution of projection directions on their surface. Therefore, considering constant number of projection directions per block, the larger the block, the sparser the projection directions on that block and the smaller the block, the denser the projection directions on that block.

The projection directions are to be communicated for the reprojection of the content at the decoder side, for example in an auxiliary patch information. The signalling structure of the auxiliary per-patch information may be as follows:
Index of the projection plane;
  Index 0 for the planes (1.0, 0.0, 0.0) and (−1.0, 0.0, 0.0);
  Index 1 for the planes (0.0, 1.0, 0.0) and (0.0, −1.0, 0.0);
  Index 2 for the planes (0.0, 0.0, 1.0) and (0.0, 0.0, −1.0);
2D bounding box (u0, v0, u1, v1);
3D location (x0, y0, z0) of the patch represented in terms of depth $\delta 0$, tangential shift s0 and bi-tangential shift r0. According to the chosen projection planes, ($\delta 0$, s0, r0) are computed as follows:
  Index 0, $\delta 0$=x0, s0=z0 and r0=y0;
  Index 1, $\delta 0$=y0, s0=z0 and r0=x0;
  Index 2, $\delta 0$=z0, s0=x0 and r0=y0.
Additional projection direction signaling can include, but is not limited to, one or more of the following:
Number of varying projection direction and constant projection direction areas;
For each varying area:
  Starting position of first projection direction angle in pixel coordinates;
  Starting projection direction angle in X and/or Y direction;
  Number of projection direction angular changes in X or Y direction;
    projection direction angle value per step;
    projection direction angle value as a function of steps, pixel position, etc.
For each static area:
  Pixel coordinates for area with perpendicular projection direction (middle of FIG. 7b);
  Pixel coordinates and projection direction angle for area with coherent projection direction (top of FIG. 7c).

Using the examples of FIGS. 7a to 7c, the number of varying projection direction and constant projection direction areas could have the following values: In the example of FIG. 7a there is not a constant projection direction area although the concentration of projection directions is higher in the middle than in the upper and lower parts of the projection plane, thus the number is "1" for FIG. 7a; in the example of FIG. 7b there is a constant projection direction area in the middle and varying projection directions both in the upper part and the lower part of the projection plane, thus the number is "3" for FIG. 7b; and in the example of FIG. 7c there is a constant projection direction area in the upper part and varying projection directions in the lower part of the projection plane, thus the number is "2" for FIG. 7c.

In one embodiment, only the difference between the current and the previous projection direction may be transmitted. In this case, the amount of data to be transmitted may be reduced as compared to transmitting each angle separately and individually. The previous projection direction may be the last defined projection direction prior to the current projection direction. Alternatively, the previous projection direction may be located at any direction and distance from the current projection direction and the current projection direction may refer to it (as a reference). Such reference may include direction and distance parameters compared to the location of the current projection direction and may define the exact same projection direction or a difference between the previous and current projection direction.

In another embodiment, only the difference between the current and a prediction of the current projection direction may be transmitted. In this case, the amount of data to be transmitted may be reduced as compared to transmitting each angle separately and individually, or transmitting the difference between current and previous projection direction. The projection direction estimate can be derived from extrapolating the projection direction changes derived from previous temporal instances. In the case of a hierarchical coding structure, the prediction may be interpolated from the temporally closest available projection directions.

In another embodiment, the changes in projection direction may be transmitted as coefficients of a function describing the projection direction distribution. In this case, the projection at the encoder may be performed using the projection directions reconstructed from this function. To avoid quantization errors, i.e. first the projection directions are defined, then a function describing the projection directions is estimated, then the coefficients of the function are quantized to the desired level, then the projection directions are generated from the function with the quantized coefficients, then the projection is performed accordingly. As an example, FIGS. 8a to 8c show how a function may be defined to depict the projection directions of a projection plane. The lines 802 represent the projection directions for the projection plane. Any function that represents the lines 802 may be used to describe the projection direction distribution over the projection plane. Such functions may be presented with at least two coefficients to be transmitted. In some embodiments, the functions may be one polynomial function or a combination of at least two polynomial functions. Any type of curve fitting algorithm may be used to define the lines 802 with respective functions.

In an embodiment, an additional residual between the function return and the actual projection direction may be signaled. Such a residual can optimize the projection direction further at minimal cost of required bit rate.

A signal may be transmitted to the decoder to define that for the current projection plane, a function is representing the projection directions. Such signal may define different types of projection direction definitions to the decoder, e.g. projection directions, difference between projection directions, function describing the projection directions, residual to function, and other related information.

In another embodiment, the projection directions are categorized to a group of projection directions with similar direction and transmitted as such e.g. 10 projection directions with angle of 40, next 15 with angle of 38, next 20 with angle of 35 etc. This is depicted in FIG. 9a where five different similar projection directions are used in five grouped sets of projection directions. The number of projection directions belonging to each group may be identical or may differ. In case that they differ, the difference to the previous number of projection directions may be used to define the number in the current group. Such embodiment would be useful for repetitive content/structure in the scene. For example, if there exist several airplanes coming from distance to land in an airport, they may be typically evenly distributed and hence, such projection would make sure that the quality of planes remains high while the sky is presented with lower quality. Any other type of repetitive structure e.g. queues, rows, lines etc. might benefit from such an embodiment. Moreover, presenting a content through a close by curtain covering a part of the scene evenly would use such an embodiment.

In another embodiment, the projection plane can be divided to blocks and each block has a series of projection directions varying from one corner to another. This may be introduced by gradual change of projection directions through the block from one corner/edge to the opposite/another corner/edge. Such embodiment may be beneficial for cases where repetitive content is present in the scene and similar projection concentration should be assigned to them. This is depicted in FIG. 9b where similar set of projection directions is repeated twice on the projection plane. In this embodiment, the projection planes in each block may be reversed in any direction, i.e. while keeping the structure, angle and distribution of projection directions, the way they are spread over the block are reversed in a desired direction. For example, the projection directions in FIG. 7a may be using this embodiment, where the top half of the projection plane is one block and the top bottom is another group. Both blocks have similar structure and only the projection directions are reversed vertically.

The definition of the projection directions may depend on, for example, one or more of the following: scene content, scene motion, viewing angle required to be covered, viewing volume to be covered, any combination of aforementioned criteria.

The projection directions may depend on the available objects directly in front of the projection plane and also the available objects on top and bottom front of the projection plane. In one example, the object(s) directly in front of the projection plane is prioritized and will be allocated higher projection direction concentration. If there are no objects directly in front of the projection plane, higher projection direction concentration can be allocated to the objects at any direction e.g. top or bottom regions of the projection plane.

The projection directions may also depend on the distance of objects from the projection plane, the farther the objects, the less the concentration of projection directions on those objects. Such dependency of projection direction concentration to distance may have a more sophisticated algorithm, for example a non-linear distance dependent concentration of projection directions. This is attributed to the common knowledge that the change in distance of close by objects is more visible to the users compared to the change in distance of the farther objects. Hence, a small change in the distance of close by objects may result in a stronger change in the concentration of projection directions as opposed to a relatively larger distance change of far objects. This is similar to the concept of depth map quantization. In an alternative embodiment, it may be required to assign more concentration of projection directions to an object which is farther from the projection plane, due to importance of that object and requirement to present it with high quality.

The projection directions may also depend on the distance of objects from an intended viewing point, i.e. "director's view". The farther the objects, the less the concentration of projection directions on those objects. Such dependency of projection direction concentration to distance may have a more sophisticated algorithm.

The projection directions may also depend on the High Frequency Components (HFCs) of the objects, the higher the HFCs the objects (the more details on the objects), the higher the concentration of projection directions on those objects.

Also the motion in the scene may affect the projection directions. e.g. as follows: the more motion in the scene, the higher the concentration of projection directions on moving objects. There exist several algorithms to detect and locate the motion in the scene e.g. from the motion vectors used in the content compression. Alternatively, comparing any two consecutive frames may result in detecting change in each part of the scene which may result from object movement or disappearance or appearance of objects in the scene. Alternatively, any motion detector algorithm or even external device may be utilized to detect and locate the motion.

The motion of an object itself may also affect the prediction directions e.g. as follows: the more motion in an object, the higher the concentration of projection directions on the objects.

Still another factor of the scene which may affect the prediction directions is the luminance of objects in the scene. For example, the higher the luminance of the objects, the higher the concentration of projection directions on those objects.

The projection directions may also depend on the objects of the scene based on any object tracking and feature extraction algorithm. For example, similar to the FIGS. 7a to 7c, the face of a person received a higher concentration of projection directions compared to the trees in the scene. In that embodiment, the projection directions will follow the movements in the scene as tracked by the object tracking algorithm. Therefore, it is not required to perform the process to allocate different projection directions separately on the consecutive frames, and the projection directions may follow the tracked object.

It may also be possible that the projection directions are based on manual quality selection of users. This may mean that one area may receive higher concentration of projection directions compared to other areas due to manual selection of user.

In the following, some examples of how scene motion may affect to the prediction directions are discussed.

The projection direction concentration may be decided considering the amount of motion in the scene or within an object. This can be decided to have lower/higher quality, based on the higher motion in the scene. It should be noted that for a part of the scene with higher motion, it can be decided to have higher or lower quality depending on the user/content provider preference, requirement of the respective application, or the content. Embodiments presented above may enable capability of projecting that part of the scene differently from the rest of the scene and does not necessarily define how the quality should be affected.

Motion respective to scene: A 3D object moving within the scene is identified. In an embodiment, the projection direction concentration is set to reflect this motion.

Motion within 3D object: A 3D object with 3D motion is identified, e.g. a person waving. In an embodiment, the concentration of projection directions is set to reflect this motion, e.g. increase projection direction concentration.

Viewing angle required to be covered may also affect the prediction directions. In some cases, a very wide viewing angle may be required while in some other cases e.g. conventional perpendicular projection, only the perpendicular direction in front of the plane is to be projected.

In some cases, the viewing volume might be restricted, e.g. the viewer is not allowed to move outside the scene. Thus, high detail is required, and a higher projection direction concentration should be applied. In some other cases, a very large viewing volume might be required, i.e. forcing the viewer to move outside the scene. Thus, less detail is required, and a lower projection direction concentration can be applied.

According to an embodiment an encoder examines the determined projection directions to find out constant projection direction areas where the determined projection directions are the same, and varying projection direction areas where the determined projection directions differ from each other, and encodes the number of at least one of the constant projection direction areas and the varying projection direction areas.

According to an embodiment an encoder encodes for each varying projection area a starting position of the first projection direction angle in pixel coordinates, a starting projection direction angle in X and/or Y direction, and/or the number of projection direction angular changes in X or Y direction. The apparatus may also encode for each constant projection direction area pixel coordinates for at least one area with perpendicular projection direction, and pixel coordinates and projection direction angle for at least one area with coherent projection direction.

According to an embodiment an encoder may divide a projection plane to blocks and determine for each block a series of projection directions varying from one corner or edge of the projection plane to another.

According to an embodiment an encoder encodes geometry information of the projection plane.

According to an embodiment information of the first projection direction and the second projection direction may encoded as a function of location on the projection plane. The information may further include at least one residual between an output of the function and the first projection direction or the second projection direction.

According to an embodiment the first projection direction and/or the second projection direction may be temporally predicted from at least one previous temporal instance of the projection plane.

Figure 10B:
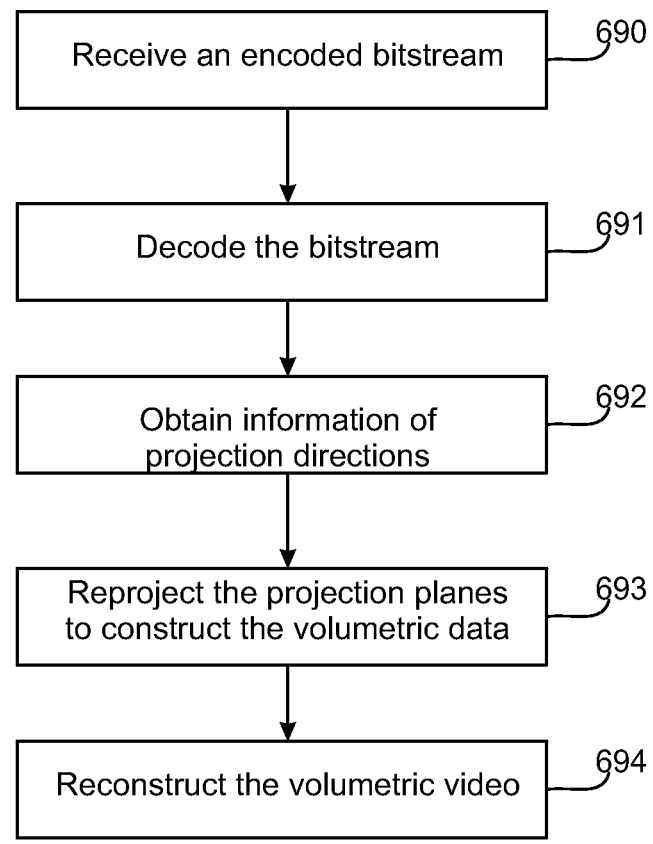
Figure 11B:
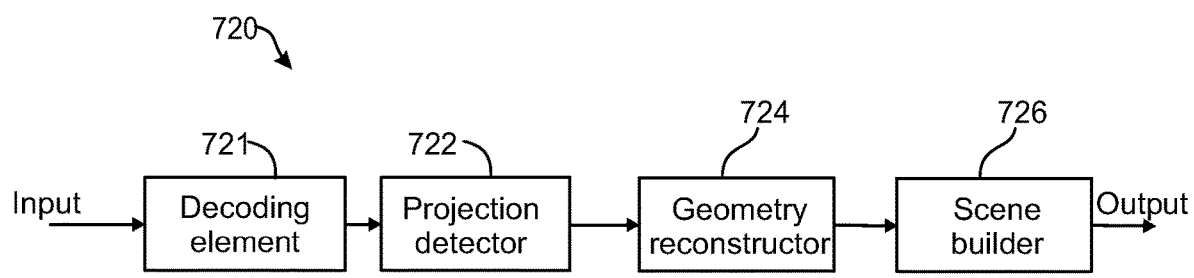

In the following, the operation at a decoder side is explained in more detail with reference to the flow diagram of FIG. 10b and the block diagram of FIG. 11b. A decoder 720 receives 690 a bitstream and a decoding element 721 decodes 691 the bitstream to reconstruct the encoded information from the bitstream. The decoded information may comprise information of the projection directions PD, PD1 and the projection plane(s) S1, and the projection data. A projection detector 722 reconstructs 692 information of projection directions at different parts of the projection plane. A geometry reconstructor 724 uses the projection directions and projection data to reconstruct 693 different parts of the projection plane S1, point clouds and/or arrays of voxels or mesh models representing objects/source volumes of the scene SCE. A scene builder 726 uses the reconstructed geometry data to form 694 a reconstructed 3D image, which may be displayed and/or stored, for example.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

It is possible to code sample arrays as separate color planes into the bitstream and respectively decode separately coded color planes from the bitstream. When separate color planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 4, the scene model SCE may comprise multiple objects OBJ1, OBJ2, and these may be treated as source volumes SV1, SV2 and each object may be coded as a texture picture, geometry picture and projection geometry information. A single object may be composed of different parts and thus different source volumes and corresponding projection surfaces may be used for these different parts.

In the above, the first texture picture of the first source volume SV1 and further texture pictures of the other source volumes SV2 may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information. The inter-picture redundancy in the picture sequences can be used to encode the texture and geometry data for the source volumes efficiently, compared to the presently known ways of encoding volume data.

An object OBJ1 (source volume SV1) may be projected onto a projection surface S1 and encoded into the bitstream as a texture picture, geometry picture and projection geometry information as described above. Furthermore, such source volume may be indicated to be static by encoding information into said bitstream on said fourth projection geometry being static. A static source volume or object may be understood to be an object whose position with respect to the scene model remains the same over two or more or all time instances of the video sequence. For such static source volume, the geometry data (geometry pictures) may also stay the same, that is, the object's shape remains the same over two or more time instances. For such static source volume, some or all of the texture data (texture pictures) may stay the same over two or more time instances. By encoding information into the bitstream of the static nature of the source volume the encoding efficiency may be further improved, as the same information may not need to be coded multiple times. In this manner, the decoder will also be able to use the same reconstruction or partially same reconstruction of the source volume (object) over multiple time instances.

In an analogous manner, the different source volumes may be coded into the bitstream with different frame rates. For example, a slow-moving or relatively unchanging object (source volume) may be encoded with a first frame rate, and a fast-moving and/or changing object (source volume) may be coded with a second frame rate. The first frame rate may be slower than the second frame rate, for example one half or one quarter of the second frame rate, or even slower. For example, if the second frame rate is 30 frames per second, the second frame rate may be 15 frames per second, or 1 frame per second. The first and second object (source volumes) may be "sampled" in synchrony such that some frames of the faster frame rate coincide with frames of the slower frame rate.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to the scene model coordinates. Alternatively or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

Decoding of the information from the bitstream may happen in analogous manner. A first texture picture may be decoded from a bitstream to obtain first decoded texture data, where the first texture picture comprises a first projection of texture data of a first source volume of the scene model to be reconstructed onto a first projection surface. The scene model may comprise a number of further source volumes. Then, a first geometry picture may be decoded from the bitstream to obtain first decoded scene model geometry data. The first geometry picture may represent a mapping of the first projection surface to the first source volume. First projection geometry information of the first projection may be decoded from the bitstream, the first projection geometry information comprising information of position of the first projection surface in the scene model. Using this information, a reconstructed scene model may be formed by projecting the first decoded texture data to a first destination volume using the first decoded scene model geometry data and said first projection geometry information to determine where the decoded texture information is to be placed in the scene model.

A 3D scene model may be classified into two parts: first, all dynamic parts, and second all static parts. The dynamic part of the 3D scene model may be further sub-divided into separate parts, each representing objects (or parts of) an object in the scene model, that is, source volumes. The static parts of the scene model may include e.g. static room geometry (walls, ceiling, fixed furniture) and may be compressed either by known volumetric data compression solutions, or, similar to the dynamic part, sub-divided into individual objects for projection-based compression as described earlier, to be encoded into the bitstream.

In an example, some objects may be a chair (static), a television screen (static geometry, dynamic texture), a moving person (dynamic). For each object, a suitable projection geometry (surface) may be found, e.g. cube projection to represent the chair, another cube for the screen, a cylinder for the person's torso, a sphere for a detailed representation of the person's head, and so on. The 3D data of each object may then be projected onto the respective projection surface and 2D planes are derived by "unfolding" the projections from three dimensions to two dimensions (plane). The unfolded planes will have several channels, typically three for the colour representation of the texture, e.g. RGB, YUV, and one additional plane for the geometry (depth) of each projected point for later reconstruction.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

A standard 2D video encoder may then receive the planes as inputs, either as individual layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signalled to allow for reconstruction at the decoder side:

in the case of a frame-packed representation: separation boundaries may be signaled to recreate the individual planes for each object,
in the case of projection-based compression of static content: classification of each object as static/dynamic may be signaled,
relevant data to create real-world geometry data from the decoded (quantised) geometry channel(s), e.g. quantisation method, depth ranges, bit depth, etc. may be signaled,
initial state of each object: geometry shape, location, orientation, size may be signaled,
temporal changes for each object, either as changes to the initial state on a per-picture level, or as a function of time may be signaled, and
nature of any additional auxiliary data may be signaled.

For the described example above, signaling may, for example, include one or more of the following parameters:

projection geometry may remain constant over a volumetric video sequence, but the location and orientation of the projection surfaces in space can change (and can be possibly be predicted in the encoding, wherein the difference from the prediction is encoded).

According to an embodiment a decoder decodes information about a number of constant projection direction areas where projection directions are the same, and a number of varying projection direction areas where the projection directions differ from each other.

According to an embodiment a decoder decodes for each varying projection area a starting position of a first projection direction angle in pixel coordinates, a starting projection direction angle in X and/or Y direction, and/or a number of projection direction angular changes in X or Y direction. The decoder may further decode for each constant projection direction area pixel coordinates for an area with perpendicular projection direction and pixel coordinates and projection direction angle for another area with coherent projection direction.

```
NUM_OBJECTS        4    // folding-chair, TV, person body, person head
FRAME_PACKED       0    // individual inputs
for i=0:NUM_OBJECTS     // initial states for each projection
    PROJ_GEO            // geometry, e.g. 0: cube, 1: cylinder, 2: sphere, ...
    PROJ_CENTER_X/Y/Z   // projection centre in real world coordinates
    PROJ_SIZE_ X/Y/Z    // projection dimensions in real world units
    PROJ_ROTATION_ X/Y/Z // projection orientation
    PROJ_STATUS         // 0: dynamic 1:static
    DEPTH_QUANT         // depth quantisation, i.e. 0 for linear, ...
    DEPTH_MIN           // minimum depth in real world units
    DEPTH_MAX           // maximum depth in real world units
end
for n=0:NUM_FRAMES
    for i=0:NUM_OBJECTS
        CHANGE     1    // i.e. 0=static, 1=translation, 2=trans+rotation, ...
        TRANS_VEC       // translation vector
        ...             // relevant data to represent change
    end
end
```

The decoder may receive the static 3D scene model data together with the video bitstreams representing the dynamic parts of the scene model. Based on the signalled information on the projection geometries, each object may be reconstructed in 3D space and the decoded scene model is created by fusing all reconstructed parts (objects or source volumes) together.

As volumetric video compression currently suffers from poor temporal compression performance, it has been noticed that this projecting of volumetric models onto 2D planes allows for using standard 2D video coding tools with efficient temporal compression. Thus, coding efficiency may be increased.

Using source volume projections onto projection surfaces instead of prior-art 2D-video based approaches, i.e. multiview and depth approaches, may provide better coverage of the scene model (or object). Thus, it has been noticed that 6DOF capabilities may be improved. Using several projection surface geometries for individual objects may improve the coverage of the scene model even further. Furthermore, standard video encoding hardware may be utilized for real-time compression/decompression of the projection surfaces (that have been unfolded onto planes). The projection and reverse projection steps may be of low complexity.

Simple objects might suffice to be projected and coded with a single projection. Complex objects or larger scene models may require several (different) projections. The In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures and projection geometry information into or from a single bitstream. It needs to be understood that embodiments can be similarly realized when encoding or decoding texture pictures, geometry pictures and projection geometry information into or from several bitstreams that are associated with each other, e.g. by metadata in a container file or media presentation description for streaming.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. Where a structural feature has been described, it may be replaced by means for performing one or more of the functions of the structural feature whether that function or those functions are explicitly or implicitly described in the claims or throughout the description.

It is clear that the present invention is not limited solely to the above-presented embodiments, but it can be modified within the scope of the appended claims.

The invention claimed is:

1. An apparatus comprising at least one processor, non-transitory memory including computer program code, the memory and the computer program code configured to, with the at least one processor, cause the apparatus to perform at least the following:
   obtain information of a three-dimensional scene;
   determine a two-dimensional projection plane for the scene;
   determine a first concentration of at least one first projection direction for a first part of the two-dimensional projection plane, based on a determined first quality level to project a first part of the scene;
   determine a second concentration of at least one second projection direction for a second part of the two-dimensional projection plane, based on a determined second quality level to project a second part of the scene;
   wherein the first concentration of the at least one first projection direction is higher than the second concentration of the at least one second projection direction, in response to the first quality level being higher than the second quality level;
   wherein the first projection direction for the first part of the two-dimensional projection plane is different from the second projection direction for the second part of the two-dimensional projection plane;
   project a first part of the scene on the two-dimensional projection plane from the first projection direction;
   project a second part of the scene on the two-dimensional projection plane from the second projection direction; and
   encode the two-dimensional projection plane.

2. The apparatus according to claim 1, said memory including computer program code, the memory and the computer program code configured to, with the at least one processor, cause the apparatus to perform at least the following:
   encode information of the at least one first projection direction and the at least one second projection direction; and
   signal the information of the at least one first projection direction and the at least one second projection direction to a decoder;
   wherein the information encoded and signaled comprises the first concentration of at least one first projection direction, and the second concentration of the at least one second projection direction.

3. The apparatus according to claim 2, said memory including computer program code, the memory and the computer program code configured to, with the at least one processor, cause the apparatus to perform at least the following:
   encode said information of the first projection direction as a difference between the first projection direction and a reference direction;
   wherein the reference direction comprises a surface normal of the two-dimensional projection plane toward a source volume within the scene.

4. The apparatus according to claim 3, said memory including computer program code, the memory and the computer program code configured to, with the at least one processor, cause the apparatus to encode said information of the second projection direction as one of the following:
   a difference between the second projection direction and the reference direction; or
   a difference between the second projection direction and the first projection direction.

5. The apparatus according to claim 1, said memory including computer program code, the memory and the computer program code configured to, with the at least one processor, cause the apparatus to perform at least the following:
   determine projection directions for the two-dimensional projection plane in X- and Y-directions.

6. The apparatus according to claim 1, said memory including computer program code, the memory and the computer program code configured to, with the at least one processor, cause the apparatus to perform at least the following:
   determine the first projection direction and the second projection direction so that the first part and the second part of the two-dimensional projection plane differ from each other in X-direction;
   use the first projection direction for areas of the two-dimensional projection plane which have a same Y-coordinate as a first area of the two-dimensional projection plane; and
   use the second projection direction for areas of the two-dimensional projection plane which have a same Y-coordinate as a second area of the two-dimensional projection plane.

7. The apparatus according to claim 1, said memory including computer program code, the memory and the computer program code configured to, with the at least one processor, cause the apparatus to perform at least the following:
   encode the first and second projection directions in an auxiliary patch information.

8. The apparatus according to claim 7, wherein the auxiliary patch information comprises one or more of the following:
   index of the projection plane;
   two-dimensional (2D) bounding box; or
   three-dimensional (3D) location of the patch represented in terms of depth, tangential shift and bi-tangential shift.

9. The apparatus according to claim 1, wherein the first concentration of the at least one first projection direction is equal to the second concentration of the at least one second projection direction, in response to the first quality level being equal to the second quality level.

10. The apparatus according to claim 1, wherein the first concentration of the at least one first projection direction for the first part of the two-dimensional projection plane, and the second concentration of the at least one second projection direction for the second part of the two-dimensional projection plane are determined based on at least one of:
- a region of interest within the scene;
- an amount of motion within the scene;
- a distance of an object from the two-dimensional projection plane;
- a complexity of the object; or
- a spatial resolution of the two-dimensional projection plane.

11. The apparatus according to claim 1,
wherein the first concentration of the at least one first projection direction, and projection directions of the at least one first projection direction adaptively change across parts of the scene depending on at least of: a region of interest within a part of the scene; an amount of motion within the part of the scene; a distance of an object from the two-dimensional projection plane within the part of the scene; a complexity of the object within the part of the scene; or a spatial resolution of the two-dimensional projection plane; and
wherein the second concentration of the at least one second projection direction, and projection directions of the at least one second projection direction adaptively change across parts of the scene depending on at least one of: a region of interest within the part of the scene; an amount of motion within the part of the scene; a distance of an object from the two-dimensional projection plane within the part of the scene; a complexity of the object within the part of the scene; or the spatial resolution of the two-dimensional projection plane.

12. The apparatus according to claim 1, wherein the second concentration of the at least one second projection direction is higher than the first concentration of the at least one first projection direction, in response to the second quality level being higher than the first quality level.

13. An apparatus comprising at least one processor, non-transitory memory including computer program code, the memory and the computer program code configured to, with the at least one processor, cause the apparatus to perform at least the following:
- decode information of a two-dimensional projection plane of a three-dimensional scene;
- decode information of a first concentration of at least one first projection direction for a first part of the two-dimensional projection plane, based on a determined first quality level to project a first part of the scene;
- decode information of a second concentration of at least one second projection direction for a second part of the two-dimensional projection plane, based on a determined second quality level to project a second part of the scene;
- wherein the first concentration of the at least one first projection direction is higher than the second concentration of the at least one second projection direction, in response to the first quality level being higher than the second quality level;
- wherein the first projection direction for the first part of the two-dimensional projection plane is different from the second projection direction for the second part of the two-dimensional projection plane;
- use the decoded information to obtain reconstructed geometry data of different parts of the two-dimensional projection plane; and
- use the reconstructed geometry data to form a reconstructed three-dimensional image.

14. The apparatus according to claim 13,
wherein the information of the first projection direction and the second projection direction is encoded as a function of location on the two-dimensional projection plane and at least one residual between an output of the function and the first projection direction or the second projection direction; and
wherein the function encodes a distribution of projection directions of the at least one first projection direction and projection directions of the at least one second projection direction.

15. The apparatus according to claim 13, said memory including computer program code, the memory and the computer program code configured to, with the at least one processor, cause the apparatus to perform at least the following:
decode said information of the first projection direction as a difference between the first projection direction and a reference direction.

16. The apparatus according to claim 15, wherein at least one of the first projection or the second projection direction are temporally predicted from at least one previous temporal instance of the two-dimensional projection plane.

17. The apparatus according to claim 15, said memory including computer program code, the memory and the computer program code configured to, with the at least one processor, cause the apparatus to decode said information of the second projection direction as one of the following:
- a difference between the second projection direction and the reference direction; or
- a difference between the second projection direction and the first projection direction.

18. The apparatus according to claim 13, said memory including computer program code, the memory and the computer program code configured to, with the at least one processor, cause the apparatus to perform at least the following:
- use the same first projection direction for areas of the two-dimensional projection plane which have a same Y-coordinate as a first area of the two-dimensional projection plane; and
- use the same second projection direction for areas of the two-dimensional projection plane which have a same Y-coordinate as a second area of the two-dimensional projection plane.

19. A method, comprising:
obtaining information of a three-dimensional scene;
determining a two-dimensional projection plane for the scene;
determining a first concentration of at least one first projection direction for a first part of the two-dimensional projection plane, based on a determined first quality level to project a first part of the scene;
determine a second concentration of at least one second projection direction for a second part of the two-dimensional projection plane, based on determined second quality level to project a second part of the scene;
wherein the first concentration of the at least one first projection direction is higher than the second concentration of the at least one second projection direction, in response to the first quality level being higher than the second quality level;
wherein the first projection direction for the first part of the two-dimensional projection plane is different from the second projection direction for the second part of the two-dimensional projection plane;

projecting a first part of the scene on the two-dimensional projection plane from the first projection direction;

projecting a second part of the scene on the two-dimensional projection plane from the second projection direction; and encoding the two-dimensional projection plane.

20. The method according to claim 19, further comprising:

encoding information of the at least one first projection direction and the at least one second projection direction; and signal the information of the at least one first projection direction and the at least one second projection direction to a decoder;

wherein the information encoded and signaled comprises the first concentration of the at least one first projection direction, and the second concentration of the at least one second projection direction.

21. A method, comprising:

decoding information of a two-dimensional projection plane of a three-dimensional scene;

decoding information of a first concentration of at least one first projection direction for a first part of the two-dimensional projection plane, based on a determined first quality level to project a first part of the scene;

decoding information of a second concentration of at least one second projection direction for a second part of the two-dimensional projection plane, based on a determined second quality level to project a second part of the scene;

wherein the first concentration of the at least one first projection direction is higher than the second concentration of the at least one second projection direction, in response to the first quality level being higher than the second quality level;

wherein the first projection direction for the first part of the two-dimensional projection plane is different from the second projection direction for the second part of the two-dimensional projection plane;

using the decoded information to obtain reconstructed geometry data of different parts of the two-dimensional projection plane; and using the reconstructed geometry data to form a reconstructed three-dimensional image.

22. The method according to claim 21, wherein the information of the first projection direction and the second projection direction is encoded as a function of location on the two-dimensional projection plane and at least one residual between an output of the function and the first projection direction or the second projection direction.

23. A non-transitory computer readable storage medium comprising code for use by an apparatus, which when executed by a processor, causes the apparatus to perform:

obtain information of a three-dimensional scene;

determine at least one two-dimensional projection plane for the scene;

determine a first concentration of at least one first projection direction for a first part of the two-dimensional projection plane, based on a determined first quality level to project a first part of the scene;

determine a second concentration of at least one second projection direction for a second part of the two-dimensional projection plane, based on a determined second quality level to project a second part of the scene;

wherein the first projection direction for the first part of the two-dimensional projection plane is different from the second projection direction for the second part of the two-dimensional projection plane;

project a first part of the scene on the two-dimensional projection plane from the first projection direction;

project a second part of the scene on the two-dimensional projection plane from the second projection direction; and encode the two-dimensional projection plane.

24. The non-transitory computer readable storage medium according to claim 23, wherein the first concentration of the at least one first projection direction is equal to the second concentration of the at least one second projection direction, in response to the first quality level being equal to or substantially equal to the second quality level.

25. A non-transitory computer readable storage medium comprising code for use by an apparatus, which when executed by a processor, causes the apparatus to perform:

decode information of a two-dimensional projection plane of a three-dimensional scene;

decode information of a first concentration of at least one first projection direction for a first part of the two-dimensional projection plane, based on a determined first quality level to project a first part of the scene;

decode information of a second concentration of at least one second projection direction for a second part of the two-dimensional projection plane, based on a determined second quality level to project a second part of the scene;

wherein the first projection direction for the first part of the two-dimensional projection plane is different from the second projection direction for the second part of the two-dimensional projection plane;

use the decoded information to obtain reconstructed geometry data of different parts of the two-dimensional projection plane; and use the reconstructed geometry data to form a reconstructed three-dimensional image.

* * * * *